United States Patent Office 3,642,915
Patented Feb. 15, 1972

3,642,915
PURIFICATION OF ALCOHOLS
Clarence R. Bresson, Bartlesville, Okla., assignor to
Phillips Petroleum Company
No Drawing. Filed May 27, 1968, Ser. No. 732,025
Int. Cl. C07c 29/24, 35/02
U.S. Cl. 260—643 B                            3 Claims

ABSTRACT OF THE DISCLOSURE

Purification of alcohols of color forming bodies comprising treating the alcohol with ozone and a reducing agent to obtain a non-odoriferous alcohol product substantially free of color forming bodies.

BACKGROUND OF THE INVENTION

This invention relates to the purification of impure alcohols. In accordance with another aspect, this invention relates to a process for the purification of alcohol products and chemical derivatives thereof with respect to color properties. In accordance with a further aspect, this invention relates to an improved process for the purification of synthetic alcohol products derived from the reaction of olefins with carbon monoxide and hydrogen, which products contain acid color forming bodies, by contacting with ozone. In accordance with a further aspect, this invention relates to the further treatment of alcohols containing color bodies by subjecting the alcohol to treatment with ozone followed by a reducing agent.

In commercial processes such as those involving the oxidation of natural gas or the various Fischer-Tropsch processes, alcohols are produced as products of the reaction. These alcohols are almost invariably contaminated with color forming bodies and other impurities and it is impractical to separate these impurities from the alcohols by ordinary fractionation. Various chemical processes have been used for purification of such impure alcohols, but a complete removal of the impurities has heretofore been almost impossible to obtain. Likewise, solvent extraction, while useful, does not completely succeed in eliminating the undesirable impurities.

Synthetic alcohols having in the range of about 8 to 13 carbon atoms are valuable compounds. One of the major uses of such alcohols is the synthesis of esters which are used as plasticizers for poly(vinyl chloride) and the like. Requirement of such alcohols for the plasticizer market is projected at a contemporary market of nearly one billion pounds per year. One desirable means of synthesizing such alcohols is by the oxo process, wherein olefins are hydroformylated with carbon monoxide and hydrogen to form the respective alcohol. The oxo process is a very desirable means of synthesizing such alcohols because of economic advantages. However, alcohols synthesized by the oxo process, and also by other means, are plagued with a problem of odor and undesirable acid color. In the more extreme cases, such alcohols produced have a black acid color and are entirely unsuitable for the synthesis of the respective esters to be used as plasticizers.

Many means have been tried to mitigate the above color problem. For example, said synthetic alcohols have been treated with reducing agents, such as hydrogen in the presence of a catalyst, borohydrides, and the like. However, in many cases such treatments have not been satisfactory to reduce the acid color of the synthetic alcohols to acceptable levels. The process of the instant invention provides a solution to the problem and constitutes a concrete advance in the art.

Accordingly, an object of this invention is to provide a process for improving the odor and color of alcohols.

It is a further object of this invention to improve the odor and color of synthetic alcohols derived from the reaction of carbon monoxide and hydrogen with or without added olefin.

It is a still further object of this invention to improve the color and to remove color forming impurities from alcohols produced from olefins by the oxo process.

A further object of this invention is to provide a simple and effective process for finishing synthetic alcohols so as to improve their color and remove color forming impurities therefrom.

A still further object of this invention is to provide a method for improving the color of esters derived from synthetic alcohols.

Other aspects, objects, as well as the several advantages of the invention, will be apparent to those skilled in the art from a study of this specification and the appended claims.

SUMMARY OF THE INVENTION

In accordance with the invention, a process is provided for converting the functional groups most responsible for color problems in alcohols which comprises treating alcohols containing acid color forming bodies and other impurities with ozone and a reducing agent to convert at least a portion of the color forming bodies to the corresponding alcohols so as to obtain a nonodoriferous alcohol product substantially free of color forming materials.

More specifically, in accordance with the invention a process is provided for the purification of oxo alcohols containing acid color forming bodies such as impurities having olefinic and carbonyl functional groups most responsible for color preblems by contacting the impure alcohols with ozone for a sufficient time to convert, at least in part, the olefinic-containing color bodies to carbonyls and ozonides, and treating the ozone contacted alcohols with a reducing agent to convert carbonyls and other impurities present to alcohols so as to obtain a non-odoriferous alcohol product substantially free of color forming materials.

The alcohols used according to the process of the invention are preferably oxo alcohols. However, it is to be understood that any synthetic alcohol having color forming bodies contained therein can be benefitted by the process of this invention.

DESCRIPTION OF PREFERRED EMBODIMENTS

According to the process of this invention, an oxo alcohol or other synthetic alcohol which contains undesirable color bodies is treated with ozone. The ozone treatment is effected at temperatures above the freezing point of the mixture being treated with ozone, but at or below about 40° C. Preferably, temperatures at or below about 25° C., but above the freezing point of the mixture, are employed. Pressure to be employed is not critical except that sufficient pressure should be employed to maintain the reactants substantially completely in the liquid phase and pressure should not be so great as to create an explosive hazard. Generally, pressures in the range of about .5 to about 2 atmospheres are suitable; atmospheric pressure is generally preferable because of convenience. Reaction times in the range of about 5 minutes to about 24 hours are normally employed, in general sufficient ozone should be passed through the reaction mixture to complete any reactions normally effected bytween ozone and such a particular reaction mixture at the conditions of temperature and pressure employed. Normally, in the range of about 0.005 to 0.05 mole of ozone per mole of alcohol are employed.

Diluents that are substantially completely nonreactive in the reaction environment can also be employed, if desired. Examples of suitable diluents include hexane, heptane, cyclohexane, and the like.

The treatment with ozone can be effected by any conventional technique. For example, oxygen or an oxygen-containing gas can be passed through a conventional ozonator and then to the alcohol containing reactor. Air is a normally convenient example of an oxygen-containing gas. In effect, the oxygen can be admixed with any gas which is substantially nonreactive in the reaction environment of the process. Continuous or batch processes can be employed.

Subsequent to treatment with ozone, the reaction mixture is treated with a suitable reducing agent. Any means of reduction can be employed which is of sufficient activity to reduce an aldehyde to an alcohol. Examples of suitable means of reduction include treatment with a borohydride such as sodium borohydride, treatment with hydrogen or a hydrogen containing gas in the presence of a sufficiently active hydrogenation catalyst such as zinc and copper catalyst, Raney nickel catalyst, zirconium promoted nickel-kieselguhr catalyst, or the like. Such reduction should be under conditions and by means known to the art to be effective for the reduction of an aldehyde to an alcohol. The only criterion is that such a reduction should be sufficient to substantially completely reduce any ozonide or aldehyde present in the reaction mixture. Of course, combinations of reduction methods can be employed, for example, the ozone treated reaction mixture can be reduced with hydrogen in the presence of a suitable catalyst and subsequently treated with a reducing agent such as sodium borohydride.

Other separation or purification steps can also be employed, if desired, for example, the reaction mixture subsequent to the reductive steps can be distilled, treated with charcoal, solvent extracted, or the like.

Suitable olefin stock for hydroformylation by the oxo process can be synthesized by means of a process wherein asphalts, etc. are cracked at high temperatures, in the presence of spent hydrogenation catalyst, to olefins, i.e., aliphatic, cyclic, and combinations thereof. This is only one example of a means of synthesizing or separating suitable olefins. In effect, any means of synthesis or derivation of such olefins known to the art can be employed. According to the hydroformylation (oxo) process, —$CH_2OH$ and —H are added to carbons of the olefin moiety. Cycloalkene rings are not split. Oxo alcohols prepared by such means have a great economic advantage in being cheap, but are also generally unsuitable for the synthesis of plasticizers because of their dark acid color. To demonstrate the process of the instant invention, a $C_8$–$C_{10}$ cut of such ozo alcohols is referred to as "oxo alcohols," however, it should be kept in mind that any synthetic alcohol containing undesirable color bodies or having undesirable odor can be employed in lieu of the said "oxo alcohols."

It will be apparent to one skilled in the art that the treating process of the instant invention can be used in conjunction with, or as an adjunct to, various other methods of alcohol purification in order to obtain an alcohol product of outstanding purity and color stability. Based on studies made with various alcohols, it has been found that the most potent color forming functional groups present are conjugated aldehydes, conjugated cyclic ketones, conjugated cyclic dienes, acyclic aldehydes and conjugated acyclic ketones. As pointed out above, in accordance with the invention the olefinic functional groups responsible for color problems are converted to carbonyl groups by ozonolysis and the carbonyl groups are then hydrogenated or reduced to the corresponding alcohol.

The value and operation of the process of this invention are more clearly demonstrated by the following examples.

EXAMPLE I

An olefin feedstock which was prepared by cracking asphalts and the like at high temperatures in the presence of spent hydrogenation catalyst and which contained olefins, i.e., aliphatic, cyclic, and combinations thereof, was hydroformylated by conventional oxo technology to produce an oxo alcohol which was then fractionally distilled. A fraction having in the range of 8 to 10 carbon atoms was catalytically treated with hydrogen but yielded a black acid color and had an undesirable odor. This was the "oxo alcohol" employed in the subsequent runs.

To a reactor was charged 1 liter of the above "oxo alcohol." Oxygen at 7.5 p.s.i.g. was passed through a Welsbach ozonizer operated at 7.5 p.s.i.g., 90 volts, 120 watts, and 1 liter per minute flow to the reactor at an ozone rate of 0.07 mole per hour. Temperature was held in the range of 24–32° C. Within 55 minutes excess ozone was eluted, as shown by color in a potassium iodide test solution. Ozone treatment was continued for an additional 5 minutes, or a total treatment time of 1 hour. About 0.01 mole of ozone per mole of alcohol was added. The now water white liquid "oxo alcohol" was flushed with nitrogen.

A stirred glass-lined reactor was charged with 400 g. of the above ozone treated material and 12 g. Girdler G–69 catalyst (reduced and stabilized zirconium promoted nickel on kieselguhr). The reactor was pressured with hydrogen at 900–1050 p.s.i.g. at 150° C. for 4 hours, and allowed to cool. The resulting mixture was distilled, and the non-odoriferous distillates were determined to have APHA acid colors as follows:

| Distillate fractions | Wt. percent | APHA acid color | Gardner acid color |
| --- | --- | --- | --- |
| 1 | 23 | 75 | |
| 2 | 59 | 80 | |
| 3 | 18 | | 1+ |

These APHA colors are nearly water white. The distillates were then slowly passed over sodium borohydride pellets at 90° C. The APHA acid color of fraction 1 was 40, of fraction 2 was 40, and of fraction 3 was 300. It will be noted that the color of the first two fractions was nearly water white and indicative of good quality alcohols.

This example demonstrates that a black acid color odoriferous oxo alcohol is readily deodorized and decolorized to a nearly water white acid color alcohol according to the process of this invention.

EXAMPLE II

An oxo alcohol which was prepared as in Example I was treated with hydrogen in the presence of Girdler G–69 catalyst as in Example I, but without the prior treatment with ozone. The APHA acid color of a 25 percent distillate fraction of the resulting product was 250, of a 50 percent distillate fraction was 150, and of a 25 percent distillate fraction, the acid color was too dark for APHA scale, and had a Gardner color of 4.

The control run of this example and the inventive run of Example I demonstrate that ozonizing prior to reduction according to the process of this invention removed sufficient color from synthetic alcohols such that the alcohols are suitable for use in synthesizing esters useful as plasticizers, but that prior art methods do not produce suitable alcohols.

SULFURIC ACID COLOR TEST FOR HIGHER ALCOHOLS (I) Scope

This method was employed for the determination of the acid color stability of an alcohol. While the conditions are severe, the results are directly related to the color of the ester produced upon esterification of the alcohol.

(II) Outline of method

Alcohol containing 8 volume percent sulfuric acid is heated at 100° C. for one hour and the color developed is measured in APHA units. This is the "APHA acid color." If too dark for the APHA scale, the color is measured on the Gardner scale.

(III) Apparatus (a) *Reaction vessel.*—An Erlenmeyer flask, 200 ml.

(b) *Mixing device.*—A magnetic stirrer equipped with a Teflon-coated stirring bar.

(c) *Buret.*—A buret of 25 ml. capacity graduated in 0.1 ml.

(d) *Heating bath.*—A mineral oil bath controlled at 100° C. or a steam bath.

(IV) Reagents and materials

*Sulfuric acid.*—96 percent ACS reagent grade, clear and colorless.

(V) Procedure (a) *Preparation of equipment.* All glassware used in this procedure must be scrupulously cleaned. A satisfactory procedure for cleaning the equipment is as follows: wash with detergent solution, rinse with tap water, chromic acid cleaning solution, tap water and distilled water. Alternatively, wash with tap water, isopropyl alcohol and distilled water. Dry the glassware in a forced-draft oven at 110° C. Do not use acetone as a final rinse.

(b) *Analysis.*—Place 100 ml. of the alcohol under test and the magnetic stirring bar in the Erlenmeyer flask. Agitate with the magnetic stirrer to obtain a good vortex without splash. Add 8.0 ml. of sulfuric acid dropwise into the edge of the vortex. Stir an additional one minute, remove stirring bar, cover flask opening with foil and place the flask in a bath at 100° C. for exactly 60 minutes. Cool the flask in top water and pour the contents into a Nessler tube. Measure the color as directed in ASTM D1209–62.

If the amount of alcohol available is limited, the quantities used in the procedure can be scaled down by one-half and run in the same equipment. Measure the color in 50 ml. tall-form Nessler tubes.

I claim:

1. A process for the purification of synthetic oxo alcohols derived from the hydroformylation of olefins with carbon monoxide and hydrogen containing acid color forming bodies which process consists of (a) contacting at least one of said alcohols containing color forming bodies having olefinic functional groups at a temperature below about 40° C. with from 0.005 to 0.05 mole of ozone per mole of alcohol sufficient to convert said olefinic functional groups to carbonyl groups and ozonides at a pressure sufficient to maintain the reactants substantially completely in the liquid state but at a pressure which is not so great as to create an explosive hazard and (b) treating the ozone contacted alcohols with a reducing agent to convert said carbonyl groups and ozonides to the corresponding alcohols so as to reduce the products of said ozone treatment and obtain a non-odiferous substantially water white alcohol product substantially free of color forming bodies said ozone having been prepared by ozonation of an oxygen-containing gas.

2. A process according to claim 1 wherein the treatment with the reducing agent is effected with at least one of (1) an alkali metal borohydride, and (2) hydrogen, in the presence of a hydrogenation catalyst.

3. A process according to claim 1 wherein the alcohol is a synthetic alcohol fraction of 8–10 carbon atoms which is first contacted with air containing ozone at a temperature below about 25° C. for a period of time of 5 minutes to 24 hours sufficient to obtain an alcohol product of substantially improved color, and contacting the thus ozone treated alcohol with hydrogen in the presence of a zirconium promoted nickel-kieselguhr catalyst to obtain a substantially water white alcohol product free of acid color bodies.

References Cited

UNITED STATES PATENTS

| | | | |
|---|---|---|---|
| 2,626,284 | 1/1953 | Smith | 260—643 E |
| 2,713,075 | 7/1955 | Doeringer | 260—638 HF |
| 2,726,199 | 12/1955 | Biribauer et al. | 260—643 B |
| 2,867,651 | 1/1959 | Wise | 260—643 F |
| 3,162,606 | 12/1964 | Giraitis et al. | 252—459 |

FOREIGN PATENTS

| | | | |
|---|---|---|---|
| 483,510 | 8/1953 | Italy | 260—643 C |
| 1,329,718 | 5/1963 | France | 260—643 C |
| 813,867 | 5/1959 | Great Britain | 260—643 B |

OTHER REFERENCES

Lange, "Handbook of Chemistry," 10th ed., (1961), p. 94, TP 151 H 25.

LEON ZITVER, Primary Examiner

J. E. EVANS, Assistant Examiner

U.S. Cl. X.R.

260—450, 452, 617 R